United States Patent
Zimmermann et al.

(10) Patent No.: US 6,632,498 B1
(45) Date of Patent: Oct. 14, 2003

(54) HEAT-ACTIVATABLE SINGLE-SIDED SELF-ADHESIVE TAPE AND ITS USE

(75) Inventors: Dieter Zimmermann, Jork (DE); Harald Kehler, Hamburg (DE); Walter Schulze, Pinneberg (DE)

(73) Assignee: tesa AG, Hamburg (DE)

( * ) Notice: Subject to any disclaimer, the term of this patent is extended or adjusted under 35 U.S.C. 154(b) by 0 days.

(21) Appl. No.: 09/371,393

(22) Filed: Aug. 10, 1999

(30) Foreign Application Priority Data

Aug. 17, 1998 (DE) .......................................... 198 37 143

(51) Int. Cl.⁷ .................................................. C09J 7/00
(52) U.S. Cl. ..................... 428/40.1; 428/41.2; 428/41.5; 428/41.7; 428/41.8; 428/41.9; 428/346; 428/347; 428/349; 428/354; 428/355; 156/310; 156/313
(58) Field of Search .............................. 428/40.1, 424.6, 428/41.2, 41.5, 41.7, 41.8, 41.9, 355, 346, 347, 349, 354; 156/310, 313

(56) References Cited

U.S. PATENT DOCUMENTS

| | | | | |
|---|---|---|---|---|
| 4,024,312 A | * | 5/1977 | Korpman | .................... 428/343 |
| 4,308,307 A | * | 12/1981 | Heath et al. | ................. 428/167 |
| 4,335,026 A | * | 6/1982 | Balinth | ........................ 524/271 |
| 5,225,267 A | * | 7/1993 | Ochi et al. | .................... 428/214 |
| 5,389,409 A | | 2/1995 | Iwasa et al. | ................... 428/31 |
| 5,491,012 A | * | 2/1996 | Luhmann | .................... 428/40.1 |
| 5,503,923 A | * | 4/1996 | Goto et al. | ................. 428/324 |
| 5,536,540 A | * | 7/1996 | Borys et al. | .................. 428/31 |
| 5,589,246 A | | 12/1996 | Calhoun et al. | ............ 428/120 |
| 6,284,378 B1 | * | 9/2001 | Junghans | ................... 428/42.1 |
| 6,403,214 B1 | * | 6/2002 | Zimmermann | .............. 428/343 |

FOREIGN PATENT DOCUMENTS

| | | | |
|---|---|---|---|
| DE | 2152871 | * | 4/1973 |
| DE | 3331 016 A1 | | 8/1983 |
| DE | 3331016 A1 | * | 11/1984 |
| EP | 0 384 598 A1 | | 8/1990 |
| WO | WO 95/13184 | | 5/1995 |

* cited by examiner

Primary Examiner—Nasser Ahmad
(74) Attorney, Agent, or Firm—Norris McLaughlin & Marcus

(57) ABSTRACT

Heat-activatable single-sided self-adhesive tape, characterized by a) a heat-activatable double-sided adhesive film strip based on thermoplastic rubber, tackifier resin and reactive resin, b) a double-sided self-adhesive tape laminated onto one side of the said strip, and c) if desired, release paper or a release film on one side of the adhesive tape.

27 Claims, No Drawings

HEAT-ACTIVATABLE SINGLE-SIDED SELF-ADHESIVE TAPE AND ITS USE

The invention relates to a viscoelastic, heat-activatable, single-sided adhesive tape and to its use for adhesive bonding of EPDM parts.

Heat-activatable single-sided self-adhesive tapes are known and are available commercially. In the automotive industry they are used preferably to bond EPDM rubber profile seals in the doorframe area. The products used for this purpose (e.g. 3M Automotive Structural Sealing Tape®) have a laminate structure with sealing compound, foam material and adhesive. On application, however, signs of detachment are evident after a certain time owing to compression primarily in the area of curvature.

The object of the invention is therefore to remedy this situation and hence to provide a product which combines good EPDM adhesion (following heat activation at e.g. 160° C./1 minute) with optimum PSA adhesion, especially in the area of curvature to the painted sheet metal.

This object is achieved by an adhesive tape as characterized more closely in the claims.

The structure of this adhesive tape therefore features a laminate of two components: firstly a heat-activatable adhesive film strip and secondly a double-sided self-adhesive tape, termed a fixer.

Reactive resins which are particularly suitable in accordance with the invention are alkylphenol resins which are especially base-reactive, as are available commercially as polychloroprene-based adhesives, e.g. Alresen® PA 565 (Hoechst), whereas regarding the other components of the adhesive film strip reference is made in particular to DE 33 31 016.

In the text below the intention is to illustrate the invention using examples but without wishing to subject it to any unnecessary restriction. The use is also evident from the examples, as is the production of the tapes.

EXAMPLE 1

First of all, a heat-activatable film strip is produced as follows:

The reactive alkylphenol resin (Alresen PA 565) from Hoechst was used (with Pentalyn H, from Hercules) in a formulation as follows (all in parts by weight):

| 53.5 | Cariflex TR 1101 | Shell |
|---|---|---|
| 25.2 | Pentalyn H | Hercules |
| 16.9 | Alresen PA 565 | Hoechst |
| 2.2 | Kronos 2160 - TiO$_2$ | Kronos |
| 2.2 | Maglite DE - MgO | Merck |

Preparation took place without Alresen PA 565 at 180° C. in a compounder with introduction of $CO_2$. The batch was then cooled to 150° C., and Alresen PA 565 was added and briefly incorporated until homogeneous. The mass was extruded to a 0.4 mm thick film which was covered on one side with release paper and cut into rolls.

An unbacked "tesafix"-4985® fixer (about 40 µm thick, with acrylate adhesive) is laminated cold onto the extruded heat-activatable adhesive tape. In the course of subsequent bonding to an EPDM sealing profile by heat activation (160° C./1 minute) an intimate bond is formed between adhesive tape and fixer. The profile thus equipped is highly suitable for bonding to painted surfaces of a car body as a door seal, especially in the doorframe. In this application, it suffers no detachment whatsoever in areas of curvature, even on prolonged service.

EXAMPLE 2

As in Example 1, a solvent/PSA composition (pressure-sensitive acrylate) is knife-coated (about 30 g solids/m$^2$) onto the adhesive tape described in that example. Because of the solvent (benzine) a firm bond is formed between adhesive tape and PSA composition even at this stage. Subsequent use, and the result, are as in Example 1.

EXAMPLE 3

The adhesive tape of Example 1 is coated (wire-wound coating bar process with Neotac 5486 from Zeneca) with an aqueous, pressure-sensitive acrylate dispersion. On heat activation (bond to the EPDM profile) at 160° C./1 minute there is good anchoring, as is evident when the assembly is used further in accordance with Example 1.

EXAMPLE 4

From 2 extruders
1. the adhesive tape of Example 1 and
2. a self-adhesive acrylate hotmelt (solvent-free acrylate composition to be coated from the melt) are conveyed into a 2-channel die and coextruded onto release paper, to give a coating which exhibits optimum anchoring. Subsequent use, and the result, are as in Example 1. No primer is required in any of the examples.

The excellent bond between EPDM and the adhesive tape of the invention is evident as follows:

Commercial EPDM plates (4 mm thick, Shore hardness: A 70, from H. Wegner, HH) are bonded with an adhesive film strip, as described in Example 1 before lamination with the fixer, for 1 minute each under gentle pressure in a heated press. Result:

| at 150° C. = | adhesive film strip peelable only with difficulty (about 13 N/cm) |
|---|---|
| at 160° C. = | partial EPDM tearing (about 15 N/cm) |
| at 180° C. = | peel removal impossible |

In every case, therefore, the adhesion between EPDM and heat-activatable adhesive film strip side is substantially higher (no reduction in bond strength even after storage at 40° C./1 week) than the PSA adhesion to, for example, painted metal sheets (about 5 N/cm).

The use according to the invention for bonding EPDM parts also leads to considerable advantages in terms of subsequent disposal or repair, in that the entire seal can be pulled out of a car, and then this EPDM/adhesive tape assembly can be separated by stripping, i.e. by pulling on the adhesive tape in the direction of the bond plane, for the uncontaminated recovery of the EPDM part on the one hand and of the adhesive tape on the other hand, after which the EPDM part, if desired, can be used again.

What is claimed is:
1. A heat-activatable single-sided self-adhesive tape comprising:
   a) a heat-activatable double-sided adhesive film strip comprising an adhesive composition based on thermoplastic rubber, tackifier resin and reactive resin;
   b) a double-sided self-adhesive tape laminated onto one side of said adhesive film strip; and
   c) optionally, a release paper or a release film adhered to one side of said double-sided self-adhesive tape.
2. The heat-activatable single-sided self-adhesive tape according to claim 1, wherein the adhesive film strip com- prises an adhesive composition based on thermoplastic rubber, tackifier resins and an admixed reactive resin, and wherein the adhesive film strip exhibits an adhesion lower than its cohesion, the adhesion of the adhesive film strip largely disappears when the adhesive film strip is extended, the adhesive film strip exhibits a ratio of peel strength to tensile strength of 1:1.5 or more, and the adhesive film strip can be detached from a substrate to which the adhesive film strip is bonded by pulling on the adhesive film strip in a direction of a plane of a bond formed between said adhesive film strip and said substrate.

3. The heat-activatable single-sided self-adhesive tape according to claim 1, wherein the reactive resin is a heat-activatable resin.

4. The heat-activatable single-sided self-adhesive tape according to claim 1, wherein the reactive resin makes up from 10 to 30% of the total weight of the adhesive composition of the adhesive film strip.

5. The heat-activatable single-sided self-adhesive tape according to claim 4, wherein the reactive resin makes up from 15 to 25% of the total weight of the adhesive composition of the adhesive film strip.

6. The heat-activatable single-sided self-adhesive tape according to claim 1, wherein the reactive resin is employed together with a metal oxide.

7. The heat-activatable single-sided self-adhesive tape according to claim 6, wherein the metal oxide is magnesium oxide.

8. The heat-activatable single-sided self-adhesive tape according to claim 6, wherein the metal oxide makes up from 1 to 3% of the total weight of the adhesive composition of the adhesive film strip.

9. The heat-activatable single-sided self-adhesive tape according to claim 8, wherein the metal oxide makes up from 1.5 to 2.5% of the total weight of the adhesive composition of the adhesive film strip.

10. The heat-activatable single-sided self-adhesive tape according to claim 1, wherein the thermoplastic rubber in the adhesive composition of the adhesive film strip is a styrene-butadiene block polymer, and the tackifier resin in the adhesive composition of the adhesive film strip is a rosin derivative.

11. The heat-activatable single-sided self-adhesive tape according to claim 1, wherein the double-sided adhesive tape which is laminated onto one side of the adhesive film strip is a pressure-sensitive adhesive tape comprising an acrylate-based adhesive composition.

12. The heat-activatable single-sided self-adhesive tape according to claim 1, wherein the adhesive film strip is from 0.4 to 0.8 mm thick, and the double-sided adhesive tape which is laminated onto one side of the adhesive film strip is from 0.02 to 0.1 mm thick.

13. A method of bonding an EPDM part to a substrate comprising:
   a) providing a heat-activatable single-sided self-adhesive tape according to any one of claims 1–12;
   b) bonding the adhesive film strip under the action of heat to the EPDM part; and
   c) bonding the double-sided adhesive tape which is laminated onto one side of the adhesive film strip to the substrate.

14. The method according to claim 13, wherein the substrate is a motor vehicle door frame.

15. A heat-activatable single-sided self-adhesive tape comprising:
   a) a heat-activatable double-sided adhesive film strip comprising an adhesive composition based on thermoplastic rubber, tackifier resin and a heat-activatable alkylphenol reactive resin;
   b) a double-sided self-adhesive tape laminated onto one side of said adhesive film strip; and
   c) optionally, a release paper or a release film adhered to one side of said double-sided self-adhesive tape.

16. The heat-activatable single-sided self-adhesive tape according to claim 15, wherein the adhesive film strip exhibits an adhesion lower than its cohesion, the adhesion of the adhesive film strip largely disappears when the adhesive film strip is extended, the adhesive film strip exhibits a ratio of peel strength to tensile strength of 1:1.5 or more, and the adhesive film strip can be detached from a substrate to which the adhesive film strip is bonded by pulling on the adhesive film strip in a direction of a plane of a bond formed between said adhesive film strip and said substrate.

17. The heat-activatable single-sided self-adhesive tape according to claim 15, wherein the reactive resin makes up from 10 to 30% of the total weight of the adhesive composition of the adhesive film strip.

18. The heat-activatable single-sided self-adhesive tape according to claim 17, wherein the reactive resin makes up from 15 to 25% of the total weight of the adhesive composition of the adhesive film strip.

19. The heat-activatable single-sided self-adhesive tape according to claim 15, wherein the reactive resin is employed together with a metal oxide.

20. The heat-activatable single-sided self-adhesive tape according to claim 19, wherein the metal oxide is magnesium oxide.

21. The heat-activatable single-sided self-adhesive tape according to claim 19, wherein the metal oxide makes up from 1 to 3% of the total weight of the adhesive composition of the adhesive film strip.

22. The heat-activatable single-sided self-adhesive tape according to claim 21, wherein the metal oxide makes up from 1.5 to 2.5% of the total weight of the adhesive composition of the adhesive film strip.

23. The heat-activatable single-sided self-adhesive tape according to claim 15, wherein the thermoplastic rubber in the adhesive composition of the adhesive film strip is a styrene-butadiene block polymer, and the tackifier resin in the adhesive composition of the adhesive film strip is a rosin derivative.

24. The heat-activatable single-sided self-adhesive tape according to claim 15, wherein the double-sided adhesive tape which is laminated onto one side of the adhesive film strip is a pressure-sensitive adhesive tape comprising an acrylate-based adhesive composition.

25. The heat-activatable single-sided self-adhesive tape according to claim 15, wherein the adhesive film strip is from 0.4 to 0.8 mm thick, and the double-sided adhesive tape which is laminated onto one side of the adhesive film strip is from 0.02 to 0.1 mm thick.

26. A method of bonding an EPDM part to a substrate comprising:
   a) providing a heat-activatable single-sided self-adhesive tape according to any one of claims 15–25;
   b) bonding the adhesive film strip under the action of heat to the EPDM part; and
   c) bonding the double-sided adhesive tape which is laminated onto one side of the adhesive film strip to the substrate.

27. The method according to claim 26, wherein the substrate is a motor vehicle door frame.

* * * * *